(12) United States Patent
Mappus et al.

(10) Patent No.: US 9,998,876 B2
(45) Date of Patent: Jun. 12, 2018

(54) INFERRING USER EQUIPMENT LOCATION DATA BASED ON SECTOR TRANSITION

(71) Applicant: AT&T INTELLECTUAL PROPERTY I, L.P., Atlanta, GA (US)

(72) Inventors: Rudolph Mappus, Plano, TX (US); Herani Soewarto Brotman, Frisco, TX (US); James White, Atlanta, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 132 days.

(21) Appl. No.: 15/221,568

(22) Filed: Jul. 27, 2016

(65) Prior Publication Data
US 2018/0098198 A1 Apr. 5, 2018

(51) Int. Cl.
*H04W 4/02* (2018.01)
*H04W 64/00* (2009.01)
(Continued)

(52) U.S. Cl.
CPC ............ *H04W 4/028* (2013.01); *G01S 5/0294* (2013.01); *H04W 64/006* (2013.01); *H04W 4/023* (2013.01); *H04W 8/20* (2013.01)

(58) Field of Classification Search
CPC ......... H04W 64/00; H04W 4/02; H04W 4/22; H04W 64/006; H04W 4/028;
(Continued)

(56) References Cited

U.S. PATENT DOCUMENTS 6,674,403 B2    1/2004  Gray et al.
6,973,319 B2   12/2005  Ormson
(Continued)

FOREIGN PATENT DOCUMENTS

CN   101449598 A    6/2009
WO   2004036934 A1  4/2004
(Continued)

OTHER PUBLICATIONS

Lachance-Bernard et al., "Network based Kernel Density Estimation for Cycling Facilities Optimal Location Applied to Ljubljana", Computational Science and Its Applications-ICCSA, 2011, Springer Berlin Heidelberg, pp. 136-150, 16 pages. Retrieved on Sep. 10, 2015. http://www.researchgate.net/profile/Matej_Niksic/publication/221434125_Network_based_Kernal_Density_Estimation_for_Cycling_Facilities_Optimal_Location_Appiled_to_Ljubljana/links/54b796920cf2e68eb2802b50.pdf.
(Continued)

*Primary Examiner* — Kwasi Karikari
(74) *Attorney, Agent, or Firm* — Amin, Turocy & Watson, LLP

(57) ABSTRACT

Determining a location of a user equipment (UE) based on historical location data and historical sector transition data is disclosed. A correlation between historic location information and a historic sector transition can be determined. The correlation can be stored in a searchable data set. A location of a current UE can be inferred based on a sector transition of the current UE. The sector transition of the current UE can be searched against eh data set to indicate a likely location of the current UE based on historical information. The searchable data set can be based on sparse location data enabling location determinations for a current UE that can otherwise lack location services. Moreover, an order of a sector transition can imbue a directionality to stored location information such that a likely location in a sector can be correlated to a transition from a prior sector of a network session of the UE.

20 Claims, 10 Drawing Sheets

(51) Int. Cl.
*G01S 5/02* (2010.01)
*H04W 8/20* (2009.01)

(58) Field of Classification Search
CPC ....... H04W 4/025; H04W 4/021; H04W 8/02; H04W 4/027; H04W 64/003; H04W 36/0083; H04W 8/10; G01S 5/0263; G01S 5/0284; G01S 5/0268
See application file for complete search history.

(56) References Cited

U.S. PATENT DOCUMENTS

| | | | |
|---|---|---|---|
| 6,975,939 B2 | 12/2005 | Edwards et al. | |
| 7,026,983 B2 | 4/2006 | Spratt | |
| 7,132,981 B1 | 11/2006 | Roberts | |
| 7,158,078 B2 | 1/2007 | Ninomiya et al. | |
| 7,250,907 B2 | 7/2007 | Krumm et al. | |
| 7,606,580 B2 | 10/2009 | Granito et al. | |
| 7,764,231 B1 | 7/2010 | Karr et al. | |
| 7,783,303 B1* | 8/2010 | Lerner | G01S 5/021 455/422.1 |
| 7,885,248 B2 | 2/2011 | Harper et al. | |
| 8,000,726 B2 | 8/2011 | Altman et al. | |
| 8,019,352 B2 | 9/2011 | Rappaport et al. | |
| 8,369,266 B2 | 2/2013 | Jin et al. | |
| 8,406,783 B2 | 3/2013 | Eitan et al. | |
| 8,412,234 B1 | 4/2013 | Gatmir-motahari et al. | |
| 8,457,880 B1 | 6/2013 | Malalur et al. | |
| 8,564,596 B2 | 10/2013 | Carrino et al. | |
| 8,798,639 B2 | 8/2014 | Wachter et al. | |
| 8,804,551 B2 | 8/2014 | Marshall et al. | |
| 8,825,080 B1 | 9/2014 | Lookingbill et al. | |
| 8,838,376 B2 | 9/2014 | Garin et al. | |
| 8,849,308 B2 | 9/2014 | Marti et al. | |
| 8,898,002 B2 | 11/2014 | Barrett et al. | |
| 8,942,725 B2 | 1/2015 | Marti et al. | |
| 9,002,612 B2 | 4/2015 | McNew | |
| 9,049,549 B2 | 6/2015 | Chang et al. | |
| 9,071,937 B2 | 6/2015 | Marti et al. | |
| 9,076,165 B2 | 7/2015 | Busch | |
| 9,113,293 B1 | 8/2015 | Rayburn et al. | |
| 9,121,933 B2 | 9/2015 | Frankenberger et al. | |
| 9,125,019 B1 | 9/2015 | Heikkila et al. | |
| 9,217,788 B2 | 12/2015 | Klepal et al. | |
| 2007/0161383 A1 | 7/2007 | Caci | |
| 2008/0188236 A1 | 8/2008 | Alles et al. | |
| 2008/0234928 A1 | 9/2008 | Matsuoka | |
| 2009/0075677 A1 | 3/2009 | Seger et al. | |
| 2010/0151789 A1 | 6/2010 | Suzuki et al. | |
| 2011/0170799 A1 | 7/2011 | Carrino et al. | |
| 2012/0317104 A1 | 12/2012 | Radlinski et al. | |
| 2013/0023286 A1* | 1/2013 | Soma | H04W 4/02 455/456.1 |
| 2013/0060632 A1 | 3/2013 | Gadhia et al. | |
| 2013/0217418 A1 | 8/2013 | Maurin et al. | |
| 2014/0171118 A1 | 6/2014 | Marti et al. | |
| 2014/0256323 A1 | 9/2014 | Edge et al. | |
| 2014/0258201 A1 | 9/2014 | Finlow-Bates | |
| 2014/0342696 A1 | 11/2014 | Cooper et al. | |
| 2015/0029176 A1 | 1/2015 | Baxter et al. | |
| 2015/0050951 A1 | 2/2015 | Thornton | |
| 2015/0100244 A1 | 4/2015 | Hannum | |
| 2015/0148058 A1 | 5/2015 | Eunice et al. | |
| 2015/0287058 A1 | 10/2015 | Dance et al. | |

FOREIGN PATENT DOCUMENTS

| | | |
|---|---|---|
| WO | 2010123655 A1 | 10/2010 |
| WO | 2013186552 A2 | 12/2013 |

OTHER PUBLICATIONS

Lichman et al,. "Modeling Human Location Data with Mixtures of Kernel Densities", Proceedings of the 20th ACM SIGKDD International Conference on Knowledge Discovery and Data Mining, 2014, ACM, 10 pages. Retrieved on Sep. 10, 2015. http://www.datalab.uci.edu/papers/kernel_KDD2014.pdf.
Peng et al., "Temporal Coverage Based Content Distribution in Heterogeneous Smart Device Networks", 2015, 6 pages. Retrieved on Sep. 10, 2015. http://cs.iupui.edu/~pengw/doc/pub/peng2015temporal.pdf.
Do et al., "A probabilistic kernel method for human mobility prediction with smartphones", Pervasive and Mobile Computing, Sep. 2014, 16 pages. Retrieved on Sep. 10, 2015. http://infoscience.epfl.ch/record/202568/files/Do_PMC_2014.pdf.
Wu et al., "Semantic Annotation of Mobility Data using Social Media", Proceedings of the 24th International Conference on World Wide Web, International World Wide Web Conferences Steering Committee, 2015, 11 pages. Retrieved on Sep. 10, 2015. http://dl.acm.org/citation.cfm?id=2741675.
Stopczynski et al., "Measuring Large-Scale Social Networks with High Resolution", PloS one 9.4, 2014, 24 pages. Retrieved on Sep. 10, 2015. http://dx.plos.org/10.1371/journal.pone.0095978.
Peddemors et al., "Predicting mobility events on personal devices", Pervasive and Mobile Computing 6.4, Aug. 2010, 28 pages. Retrieved on Feb. 19, 2016. https://www.researchgate.net/publication/220310410_Predicting_mobility_events_on_personal_devices/.
Smith, et al. "Tracking moving devices with the cricket location system." Proceedings of the 2nd international conference on Mobile systems, applications, and services. ACM, 2004. http://nms.csail.mit.edu/papers/tracking_mobisys04.pdf, 13 pages.
Blumenstock, et al. "Probabilistic inference of unknown locations: Exploiting collective behavior when individual data is scarce." Proceedings of the Fifth ACM Symposium on Computing for Development. ACM, 2014. http://www.jblumenstock.com/files/papers/jblumenstock_dev2014.pdf, 9 pages.
Li, et al. "Inferring movement trajectories from gps snippets." Proceedings of the Eighth ACM International Conference on Web Search and Data Mining. ACM, 2015. https://www.cs.cmu.edu/~muli/file/geo.pdf, 10 pages.
Kaushal, et al. "Location-based services & positioning technique using SUPL (Secure User Plane Location)", www.inttechservices.com, http://www.Inttechservices.com/media/31880/wp_locationbasedservicesandpositioningtechniqueusingsupl.pdf, May 2015. 11 pages.
Ferris, et al. "Gaussian processes for signal strength-based location estimation." In proc. of robotics science and systems. 2006. http://www.roboticsproceedings.org/rss02/p39.pdf, 8 pages.
Office Action dated Apr. 18, 2017 for U.S. Appl. No. 14/947,152, 34 pages.

* cited by examiner

US 9,998,876 B2

INFERRING USER EQUIPMENT LOCATION DATA BASED ON SECTOR TRANSITION

TECHNICAL FIELD

The disclosed subject matter relates to inferring a user equipment location. More specifically, this disclosure relates to inferring a user equipment location based on a historical equipment density of a sector correlated to a historical sector transition.

BACKGROUND

By way of brief background, a conventional location service can generally provide a location associated with a sector of coverage provided by a radio device of a radio access network (RAN) e.g., a sector associated with a NodeB, eNodeB, etc. The conventional location data service can, in some instances, poorly represent the actual location of the user equipment (UE) being located. A convention location data service, for example where the UE does not provide more accurate location information via global positioning system (GPS), assisted GPS (aGPS), etc., can employ a 'shorthand' technique for indicating a location of a UE. This shorthand can return a designated location associated with a service sector for the UE. Typical location associations for a conventional location data service can substitute, as examples, the location of the radio device of the RAN, a centroid of the serving sector, or some other arbitrarily selected location associated with the serving sector, etc., as the location of a UE. Thus, for example, a UE in a conventional system can be indicated as being located at the physical location of the radio device of the RAN even where it is actually located some distance from the radio device. It can be common for a UE to be reported as being as much as several kilometers from the UE's actual location in these conventional systems, e.g., where the radio device is several kilometers from the UE and the conventional system nonetheless indicates, as 'shorthand' location data, that the UE is collocated with the radio device.

This can be particularly problematic in environments where UEs cannot, or otherwise do not, frequently provide other types of more accurate location data, e.g., in environments where UEs are generally not GPS/aGPS enabled, environments where UEs don't generally report accurate location information, etc. It can be noted that in environments where accurate location data, e.g., GPS, aGPS, etc., is not readily available, or perhaps even possible, that a conventional location data service can providing less accurate location estimates based on the aforementioned conventional techniques. Even where some UEs can provide accurate location data, the accurate location data can often be sparse in comparison to the overall number of UEs employing the associated wireless network in those areas. This sparsity can result from, among other causes, a relatively low number of UEs providing accurate location data, UEs providing intermittent accurate location data, etc.

DETAILED DESCRIPTION

Figure 1:
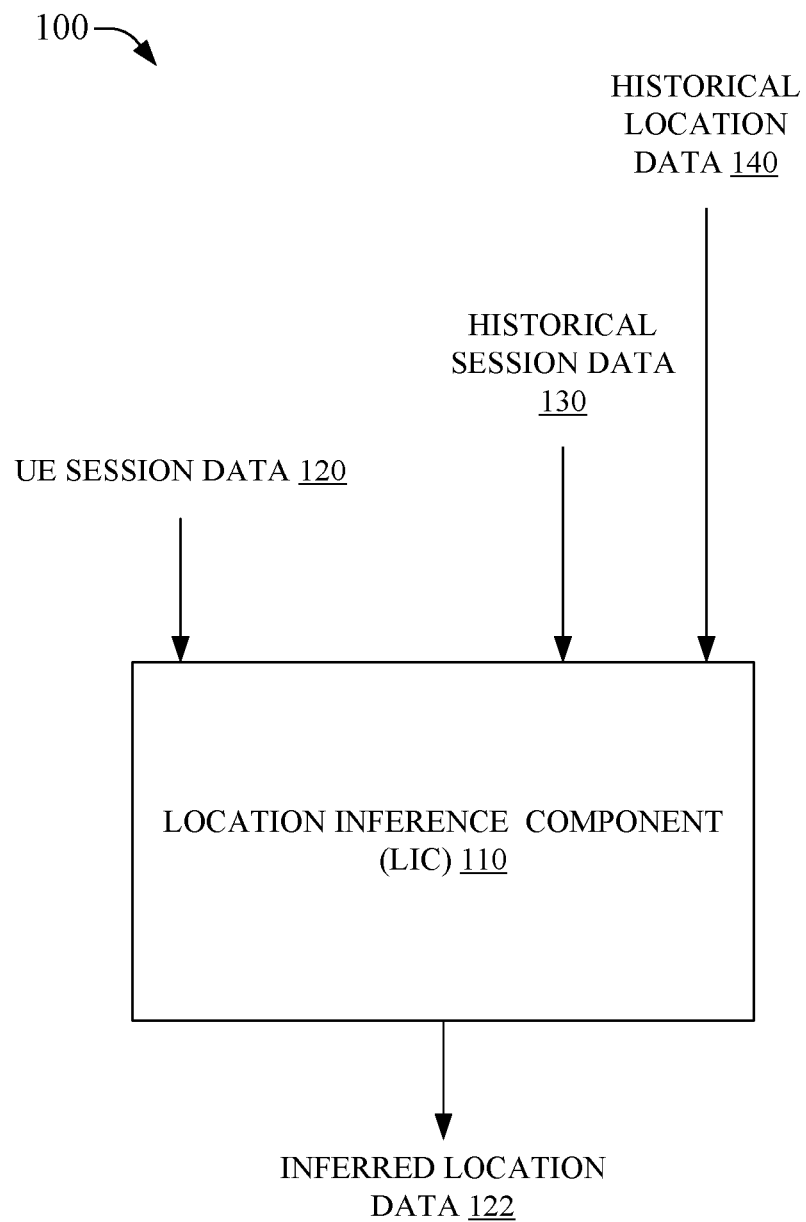
FIG. 1 is an illustration of an example system that can enable access to inferred location data based on historical session data and historical location data in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Whereas a conventional location data service may merely provide a location for a UE as a location generally associated with a serving sector, it can be desirable to provide more accurate location estimates for the UE. A serving sector can be a wireless network coverage area, generally known as a sector that is associated with providing wireless network coverage to a UE via a radio device of a RAN. A sector can be associated with a radio device of the RAN, e.g., a radio device of a NodeB, eNodeB, etc. A serving sector can be a sector that is currently providing wireless service to a UE. A non-serving, more commonly just 'sector,' can be another sector not currently providing wireless service to the UE, although a non-serving sector from the perspective of a first UE can be a serving sector from the perspective of another UE.

A conventional location data service, in some instances, can employ a 'shorthand' or 'shortcut' technique that can typically provide location data for a UE that may poorly represent an actual location of the UE. This shorthand, in the absence of more accurate location data, can simply return a designated location associated with a serving sector. In some circumstances, a location for a UE can be substituted with a location of a serving RAN radio device or some other arbitrarily selected default-type location associated with the serving sector. Thus, for example, a UE in a conventional system can be indicated as being located at the same physical location as the RAN radio device serving the UE. This can be true of conventional location data service techniques even where the UE is actually located some distance from the RAN radio device. Differences between an actual location and an estimated location in a conventional system can be on the order of the size of the sector itself, e.g., a UE in the sector can be reported as being located at the RAN radio device location even where it, in actually, can be located anywhere in the sector, including at the edge of the sector. In an example, where a sector provides coverage out to 3 kilometers, the location of the UE can be off by as much as about 3 kilometers.

The lack of accuracy in conventional technologies can be particularly common in environments where UEs cannot, or otherwise do not, frequently provide other types of more accurate location data, e.g., in environments where UEs are generally not GPS enabled, not aGPS enabled, environments where UEs don't generally report accurate location information, etc. In some environments where accurate location data, e.g., GPS, aGPS, etc., is not readily available, or perhaps even possible, a conventional location data service can provide location estimates based on the aforementioned conventional techniques. Even where some UEs can provide accurate location data, the accurate location data can often be sparse in comparison to the overall number of UEs employing the associated wireless network in those areas. This sparsity can result from, among other causes, a relatively low number of UEs providing accurate location data, UEs providing only intermittent accurate location data, etc. As such, it can be desirable to improve the accuracy of location data provided by a location data service in contrast to conventional techniques, more especially in environments with sparse accurate location reporting.

Providing location data for mobile devices in a wireless network, where accurate location data is sparse, can be difficult. UEs, e.g., mobile devices, etc., can report accurate location data infrequently to the wireless network, only some UEs may regularly report accurate location data to the wireless network while other UEs don't report at all or only report infrequently, etc., resulting in sparse location data for any given sector. Leveraging sparsely reported accurate location data can enable inferring location data for UEs, e.g., between reports of accurate location data, for UEs that cannot or do not report accurate location data, etc. Identifying a likely location for a UE in a wireless network sector can be based on identifying a densely populated location, e.g., a dense bin, etc., in the sector. An inference of a UE location can therefore be based on an inference related to a dense bin of a sector. Moreover, a transition between sectors can be employed to infer a UE location based on a correlation between a dense bin and a historical sector transition. This can result in location data that can more accurately reflect the location of a UE than simply using a location of associated with a radio device for a sector, e.g., rather than reporting a default-type location for a sector, the reported location can reflect areas that have a historically higher probability of being populated for a given transition between sectors, etc. As an example, northbound traffic from a first sector to a second sector can historically be associated with congregating at a shopping mall along the East side of a road, while southbound traffic, transitioning from a third sector to the first sector, can be associated with congregating at another location, such as where there may be no exit from the southbound road to the shopping mall. Thus, in the example, where a UE is determined to transition from the first to the second sector, indicating northbound travel, can result in inferring that the most likely location of the UE is at the shopping mall. Moreover, in this example, where the UE is determined to traverse from the third sector to the first sector, indicating southbound travel, the most likely location can be the other location. It will be noted, in this example, that where a radio device of the wireless network is located some distance from the shopping mall or the other location, the location of the shopping mall or the other location can be a more accurate location than simply using the location of the radio device as a default location for all devices in the first sector as can be reported in a conventional system.

The term historical sector transition, as used herein, generally connotes sector transitions that have occurred in a first time period ending prior to a second time period ending, e.g., a sector transition that occurred last week can be considered a historical sector transition in view of a sector transition that occurred two days ago, two minutes ago, one second ago, etc. Similarly, the term historical location data generally refers to location data from a time period that occurs before another time period, e.g., location data from a week ago can be considered historic location data in view of location data from two days ago, two minutes ago, one second ago, etc. Conversely, the term 'current' or 'instant' as applied to location data, sector transition, session data, etc., generally connotes occurrences/data of a second time period ending after an ending of a first earlier time period. Of note, a sector transition that occurs after a historical sector transition can be a 'current sector transition' even where the 'current sector transition' can occur in the past, e.g., a sector transition recorded two weeks ago can be termed a 'current sector transition' where it corresponds to a historical sector transition that ended three weeks in the past, three months in the past, one year in the past, etc. In some instances, a 'current sector transition' can occur in the immediate past, e.g., seconds, minutes, hours, etc., in the past and in relation to a historical sector transition that ended prior to the time of the 'current sector transition', such that a 'current sector transition' that occurred four minutes in the past is current in relation to a historical sector transition that occurred more than four minutes in the past.

The density analysis and correlation of historical sector transitions can adapt to reflect changes in population density, e.g., the dense bin can shift to a different location as the historical data reflects changes in where UEs congregate. As such, the dense bin can reflect changes in where UEs congregate, an aspect is not readily possible in conventional techniques, e.g., a radio device location is typically fixed and does not change with changes in UE location over time. To continue the previous example, where a new exit is built providing southbound traffic access to the shopping mall, historical sector transitions for southbound UEs can be associated with increasing density at the shopping mall location such that transitions from the first to second sector and transitions from the third to first sector can both be associated with a dense bin at the location of the shopping mall. This is again, typically more accurate than the location of the radio device that is located a distance from the shopping mall.

In some embodiments, a most likely location point in a coverage pattern can be estimated using a kernel density estimation (KDE) technique to provide an estimate of most frequented locations in a coverage area. For a sector, collected location data can be grouped/binned to a closest geographic coordinate system, e.g., a bin. In some embodiments, data binning can also comprise data processing to reduce effects of minor observation errors. The location data values can be assigned to a bin, e.g., a determined geographic interval, as a form of quantization of the location values. A 'bin' can be any arbitrary size and/or shape, but can often be represented as a simple grid pattern. As an example, the military grid reference system (MGRS). MGRS bins can be considered a standard way of binning location data, e.g., latitude and longitude, with arbitrary precision. MGRS can be the geo-coordinate standard used by some militaries for locating points on the earth. The MGRS is historically derived from the universal transverse mercator (UTM) grid system and the universal polar stereographic (UPS) grid system, but typically uses a different labeling convention. It will be noted that other techniques, e.g., Gaussian estimators, etc., for determining areas of UE density in a given sector can be employed without departing from the scope of the presently disclosed subject matter. The granularity of the bin coverage can be selected to reflect parameter(s) relevant to an environment, e.g., in an urban environment, a finer granularity, e.g., a smaller bin size, can be employed in contrast to a larger bin size, e.g., a coarser granularity, in a rural/agrarian environment.

In a further aspect, supplemental data can also be consumed to enhance an accuracy of inferred location data. In some embodiments, supplemental data can be a source of accurate location data, sometimes more accurate than GPS/aGPS, etc. As an example, a network operator can receive access point location data that can be more accurate than GPS type location data, which information can be employed to hyper-accurately locate a UE. In a further example, user inputs can be employed to more accurately determine a UE location, e.g., where a user does an internet search for a particular destination, this information can be used to supplement GPS location data and provide hyper-accurate location information. As such, the supplemental data can improve correlations between sector transitions and location data in a given sector. Supplemental data can comprise calendar information associated with a user profile of a UE, social media information associated with a user profile of a UE, access/handshake events for wireless connections associated with a UE, billing addresses associated with a UE, home addresses associated with a UE, work addresses associated with a UE, road/route map data, tethering events between a first UE a second UE allowing the location of the second UE to be affiliated with the location of the first UE, payment for services such as tolls, parking, movie tickets, etc., associated with a user profile affiliated with a UE, etc., such that nearly any type of event affiliated with the UE that can be associated with an accurate location can be employed in correlating a sector transition with a historical location of a UE to enable determining/updating a dense bin that can be employed in inferring a location of a current UE given a sector transition.

In some embodiments, a distance between a dense bin and a radio device location can be determined. Where the distance is determined to satisfy a rule related to a selectable distance between the radio and the bin, e.g., the distance is sufficiently large, has a small deviation, etc., the location of the dense bin can be employed. Similarly, where the rule is not satisfied, e.g., the distance is not sufficiently large, has a large deviation, etc., the location of the radio device can be employed. In an aspect, this can be useful where the location of the radio device can be known with a high degree of precision and, as such, can be a desirable location to use where the determined distance from a dense bin can be suspected of being inaccurate, e.g., large deviations in location information being assigned to the dense bin, error, etc., or where the dense bin is simply located so close to the radio that using the radio location is deemed to be sufficiently accurate. Similarly, the location of the radio device can be employed where the bin density does not satisfy other rules, such as but not limited to, the bin density being derived from a statistically significant number of reporting UEs, areas of known radio interference, location data corruption, session data corruption, GPS/aGPS reporting errors, etc. In this aspect, where the historical session data, historical location data, supplemental data, or combinations thereof are compromised sufficiently, e.g., satisfying a rule related thereto, then it can be determined that an inference as to a current UE location can be correspondingly suspect and can failover to using a location of a radio of the service sector.

It is also noted that inferred location by the presently disclosed subject matter is typically more accurate than simply providing the radio device location according to conventional techniques. However, the inferred location is typically not as accurate as location data reported via GPS, aGPS, etc. Despite this, the presently disclosed subject matter can provide valuable location information in environments where there is sparse accurate location data. As an example, where historically some UEs transitioning into a first sector from a second sector report a first location, an inference can be formed that when a current UE transitions from the second to the first sector that the current UE will also be located at the first location. However, in this example, where the current UE is actually located at a second location, the inference can be found to be incorrect. Despite this incorrect information given for an individual current UE, a location of a current UE can still be more accurate than no location data at all, reporting the location as the same as a serving sector radio device, etc., given statistically significant historical location data and sector transition data. Moreover, with increasing sample size for historical location data correlated to the example transition from the second sector the first sector, there, in fact, can be an increase accurately inferring a UE location, on the whole, despite outlier individual UE location misrepresentations. Additionally, where binning is adapted to result in high contrast between bin-density levels for adjoining bins, accuracy in inferences can also be improved, e.g., where adjoining bins show similar density there can be a lower probability of a current UE being in any one particular bin as compared to adjoining bins having sharply different densities. Similarly, a frequency of updating bin densities can be associated with a level of accuracy. As such, the parameter(s) of the disclosed subject matter can be adapted to fit a particular environment or determined analytical goal without departing from the scope of the current disclosure. It will be noted that where all UEs are capable of accurate location information, e.g., GPS, etc., at all times, there is likely to be a lesser need for the disclosed subject matter, however, in real world environments with large populations of UEs, for a given number of accurate location reporting UEs, the disclosed subject matter can provide statistically relevant location information for non-reporting UEs that can be more accurate than conventional techniques.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages and novel features of the disclosed subject matter will become apparent from the following detailed description when considered in conjunction with the provided drawings.

FIG. 1 is an illustration of a system 100, which can enable access to inferred location data 122 based on historical session data 130 and historical location data 140 in accordance with aspects of the subject disclosure. System 100 can comprise location inference component (LIC) 110. LIC 110 can receive historical session data 130. Historical session data 130 can comprise information about historical UE transitions between sectors. As an example, where a UE session is in progress, employing a radio device of a first sector while moving into an area served by a second sector, the communicative link can be transferred from the radio device of the first sector to a radio device of the second sector, e.g., a handover between sectors that is well understood in the relevant art.

LIC 110 can further receive historical location data 140. Historical location data can comprise accurate location data, e.g., location data determined via GPS, aGPS, etc., for a UE. The historical location data can be employed to determine a location of high UE population density, e.g., a dense bin. The dense bin can represent an area of a sector having a higher density of accurate location data UEs reporting, e.g., an area of the sector where there is a higher density of reporting UEs than other areas of the sector. This can suggest that UEs, both reporting and non-reporting, generally are located in the area represented by the dense bin.

Historical location data 140 can be correlated to historical session data 130 by LIC 110. For a wireless network environment having a number of UEs, some of which report accurate location data, the correlation of historical location data to sector transition data can result in a data set that can suggest a relationship between directionality, as is related to the order of sector transitions, and a dense bin. In an aspect, a UE historically transitioning sectors in a first order can be associated with the same, or a different, dense bin than a UE historically transitioning sectors in a second order. As an example, a UE that transitions sectors while traversing a route from A to B can be associated with a first dense bin, while a UE traversing sectors on a route from B to A can be associated with a second dense bin. In another example, a UE that transitions sectors while traversing a route from A to B can be associated with a first dense bin, while a UE traversing sectors on a route from B to A can be associated with the first dense bin. As such, the directionality or order of sector transitions can be individually correlated with a dense bin that can be the same or different and can reflect the environment in which the UE is operating, e.g., route features, user propensities, etc.

The correlation of historical location data and historical sector data can be employed in inferring a location of a current UE. LIC 110 can receive UE session data 120. UE session data 120 can comprise sector transition information for a current UE. The sector transition information can be employed to search a data set comprising correlation(s) between historical location data and historical session data. As an example, where a current UE transitions sectors associated with a route from A to B, and the data set comprises a correlation between historical sector transitions on the route from A to B with a first dense bin, it can be inferred that the current UE location is within the area associated with the first dense bin. Likewise, where the current UE traverses sectors from B to A and the historical correlation of B to A is associated with a second dense bin, the inference that the current UE is located within the second dense bin can be determined. As such, LIC 110 can enable access to inferred location data 122. In the bounds of the current example, inferred location data 122 can comprise location data for the first dense bin where the sector transitions are from A to B, or can comprise location data for the second dense bin where the sector transitions are from B to A. Moreover, in some instances, the example first and second dense bin can be the same dense bin representing the same area, or the example first and second dense bin can be different dense bins representing different areas.

In some embodiments, the sector transitions can be limited to one transition from a first sector to a second sector. Where a route comprises a plurality of sector transitions, for example from sector A→B→C→D, a first correlation can be between the historical location data in sector B and the corresponding transition from sector A→B, a second correlation can be between the historical location data in sector C and the corresponding transition from sector B→C, and a third correlation can be between the historical location data in sector D and the corresponding transition from sector C→D. Parsing of the historical location and session data can be included in a data set and can reflect historical conditions/behaviors for transitions between each sector or a route comprising a plurality of sector transitions. For a current UE transitioning from sector A→D, these embodiments can form an inference that the current UE is at a dense bin of D only for transitions from sector C. As an example, where a wireless network environment supports, for example, one million UEs, only some of the UEs are GPS enabled, and only some of the GPS enabled UEs have reported location data in the past seven days, this information can be correlated to historical session data to form inferences about the location of UEs in the wireless network environment. Continuing the example, where in the last seven days, 2,000 transitions from sector A→B of the wireless network environment report accurate location information, 92% can report at bin R8 of sector B, 3% can report at bin R9 of sector B, and the remaining 5% can report at other bins of the sector B. As such, in this example, there can be a strong correlation between sector transitions from A→B as being located at bin R8. Where, in the example, another UE transitions from sector A→B, an inference can be made based on the thousands of historical data points that the current UE will likely be located in R8 of sector B. Moreover, in this example, where bin R8 geographically includes a popular restaurant next to a lake, this supplementary information can be employed to infer that the current UE is located at the restaurant within bin R8 rather than in the wet portion of bin R8. It is noted that the specific numbers and parameters of the present example are arbitrarily selected for illustrative purposes only and are not intended to limit the disclosure in any way.

In some embodiments, the data set can further comprise segments from other routes, such as other historical data for corresponding transitions from sector D→C, other historical data for A→B, other historical data for B→C, etc. Moreover, In some embodiments, such as where sector overlap allows, some segments can be included in the data set, such as other historical data for A→D, indicating that a transition can be by a first route from A→B→D (e.g., never transitioning between B→C) and another route can be from A→D directly. For a current UE transitioning from sector A→D, these embodiments can be employed to form an inference that the current UE is at a first dense bin of D only for transitions from sector C→D, a second dense bin of D only for transitions from sector B→D, and a third dense bin of D only for transitions from sector A→D. Of note, combinations of the first, second, and third dense bin of D can be the same or different.

In some embodiments, the sector transitions can comprise a plurality of transitions from a starting sector to an ending sector. As before, where a route comprises a plurality of sector transitions, for example from sector A→B→C→D, a first correlation can be between the historical location data in sector D and the transition from sector A (the starting sector) to D (the ending sector). This can reflect that UEs starting in A and ending in D are typically associated with a dense bin in D and that the transition across sectors B and C is inherently convolved in the sector pair "A→D". In an aspect, where other routes between sector A and sector D are also represented, for example A→B→F→D, then the dense bin in D can reflect behaviors associated with UEs starting at A and ending at D for both routes, e.g., both A→B→C→D and A→B→F→D. For a current UE transitioning then from sector A→D, regardless of route, these embodiments can form an inference that the current UE is at the dense bin of D.

In an aspect, the embodiments disclosed herein can be combined. As such, in some embodiments, some areas served by some sectors can employ parsed route sector transitions and other areas served by other sectors can employ start to end sector transitions, etc. Moreover, in some embodiments, both parsed route and start to end sector transitions can be performed concurrently allowing for inferences based on either or both. In these embodiments, selection of a likely location can be based on another criterion, for example, a history of the current UE, etc.

Figure 2:
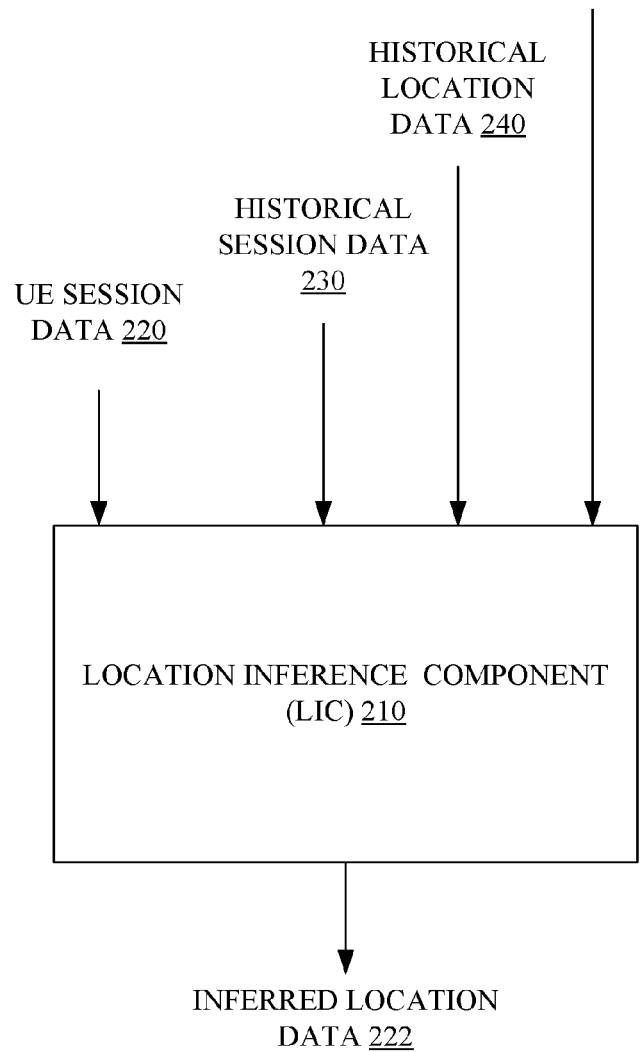
FIG. 2 is a depiction of an example system that can enable access to inferred location data based on historical session data, historical location data, and supplemental data, in accordance with aspects of the subject disclosure.

FIG. 2 is a depiction of a system 200 that can enable access to inferred location data 222 based on historical session data 230, historical location data 240, and supplemental data 250, in accordance with aspects of the subject disclosure. System 200 can comprise LIC 210. LIC 210 can receive historical session data 230. Historical session data 230 can comprise information about historical UE transitions between sectors, e.g., a handover event between sectors of a communication session for a UE.

LIC 210 can further receive historical location data 240. Historical location data can comprise accurate location data, e.g., location data determined via GPS, aGPS, etc., for a UE. The historical location data can be employed to determine a location of high UE population density, e.g., a dense bin. The dense bin can represent an area of a sector having a higher density of UEs reporting accurate location data, e.g., an area of the sector where there is a higher density of reporting UEs than other areas of the sector. This can suggest that UEs, both reporting and non-reporting, are typically located in the area of the sector represented by the dense bin.

LIC 210 can receive supplemental data 250. Supplemental data can be data other than accurate location data, e.g., other than GPS data, aGPS data, etc. In an aspect, supplemental data can be employed to determine location data and, in some instances, hyper-accurate location data. As an example, where a UE is provided to an employee and is carried by the employee to work, when the UE enters a sector serving the area associated with the entrance to the employer's campus, the billing address, e.g., the employer's address, can be sourced as supplemental data to hyper-accurately determine that the UE is at the entrance to the employer's campus, which, in some instances, can be more accurate than GPS location information. In another example, where a UE user uses a wireless carrier application that allows geotagging, e.g., identifying when the user is at a restaurant, movie theatre, gym, etc., a user input geotag can be employed as hyper-accurate location information. Similarly, use of social media applications can provide access to similar geotagging data. As a further example, use of an access point (AP) by a UE can be associated with generating supplemental data that can indicate that the UE is within a determined distance of the AP. As another example, searching for a destination performed on the UE can supply both location and intended route information as supplemental data that can be employed in inferring a location in a sector and correlating that location to session data. Numerous other examples of supplemental data can be readily appreciated and all are considered within the scope of the current disclosure even where not explicitly recited herein for the sake of clarity and brevity.

Historical location data 240 and supplemental data 250 can be correlated to historical session data 230 by LIC 210. The correlation(s) can be embodied in a data set. The data set can be stored local to LIC 210 or remote from LIC 210. For a wireless network environment having a plurality of UEs, some of which report accurate location data, the correlation of historical location data 240 and supplemental data 250 to sector transition data comprised in historical session data 230 can result in a data set that can suggest a relationship between directionality, via the order of sector transitions, and a dense bin of a sector. In an aspect, a UE historically transitioning sectors in a first order can be associated with the same, or a different, dense bin than a UE historically transitioning sectors in a second order. As such, the directionality or order of sector transitions can be individually correlated with a dense bin that can be the same or different and can reflect the environment in which the UE is operating, e.g., route features, user behaviors, etc.

The correlation of historical location data 240 and supplemental data 250 with historical sector data can be employed in inferring a location of a current UE. LIC 210 can receive UE session data 220. UE session data 220 can comprise current sector transition information for a current UE. The current sector transition information can be employed to search a data set comprising correlation(s) between historical location data 240, supplemental data 250, and historical session data 230. As an example, where a current UE transitions sectors associated with a route from A to B, and the data set comprises a correlation between historical sector transitions on the route from A to B with a first dense bin, it can be inferred that the current UE location is within the area associated with the first dense bin. The first dense bin can be determined via analysis of historical location data 240 and supplemental data 250. Likewise, where the current UE traverses sectors from B to A and the historical correlation of B to A is associated with a second dense bin, the inference that the current UE is located within the second dense bin can be determined. As such, LIC 210 can enable access to inferred location data 222.

In some embodiments, the sector transitions can be limited to one transition from a starting sector to an ending sector, e.g., a first (starting) sector to a second (ending) sector. Where a route comprises a plurality of sector transitions, for example from sector A→B→C→D, a plurality of correlations can be determined, e.g., for sector A→B and a dense bin in B, for B→C and a dense bin in C, and for C→D and a dense bin in D. Parsing of the historical location and session data can be included in the data set and can reflect historical conditions/behaviors for transitions between each sector of a route comprising a plurality of sector transitions. For a current UE transitioning from sector A→D, these embodiments can form an inference that the current UE is at a dense bin of the ending sector, e.g., sector D, only for transitions from the starting sector, e.g., sector C. In some embodiments, the data set can further comprise segments from other routes.

In some embodiments, the sector transitions can comprise a plurality of transitions from a starting sector to an ending sector. As before, where a route comprises a plurality of sector transitions, for example from sector A→B→C→D, a first correlation can be between a dense bin of sector D and the transition from the starting sector, e.g., sector A, to the ending sector, e.g., sector D. This can reflect that UEs starting in A and ending in D are typically associated with the dense bin in D and that the transition across sectors B and C is inherently convolved in the sector pair "A→D". Other routes between sector A and sector D can be represented in the same sector pair "A→D," for example A→B→F→D. As such, the dense bin in D can reflect behaviors associated with UEs starting at A and ending at D for both routes, e.g., both A→B→C→D and A→B→F→D. Thus, a current UE transitioning then from sector A→D, regardless of route, can be employed to infer that the current UE is at the dense bin of D. In an aspect, the embodiments disclosed herein can be combined.

Figure 3:
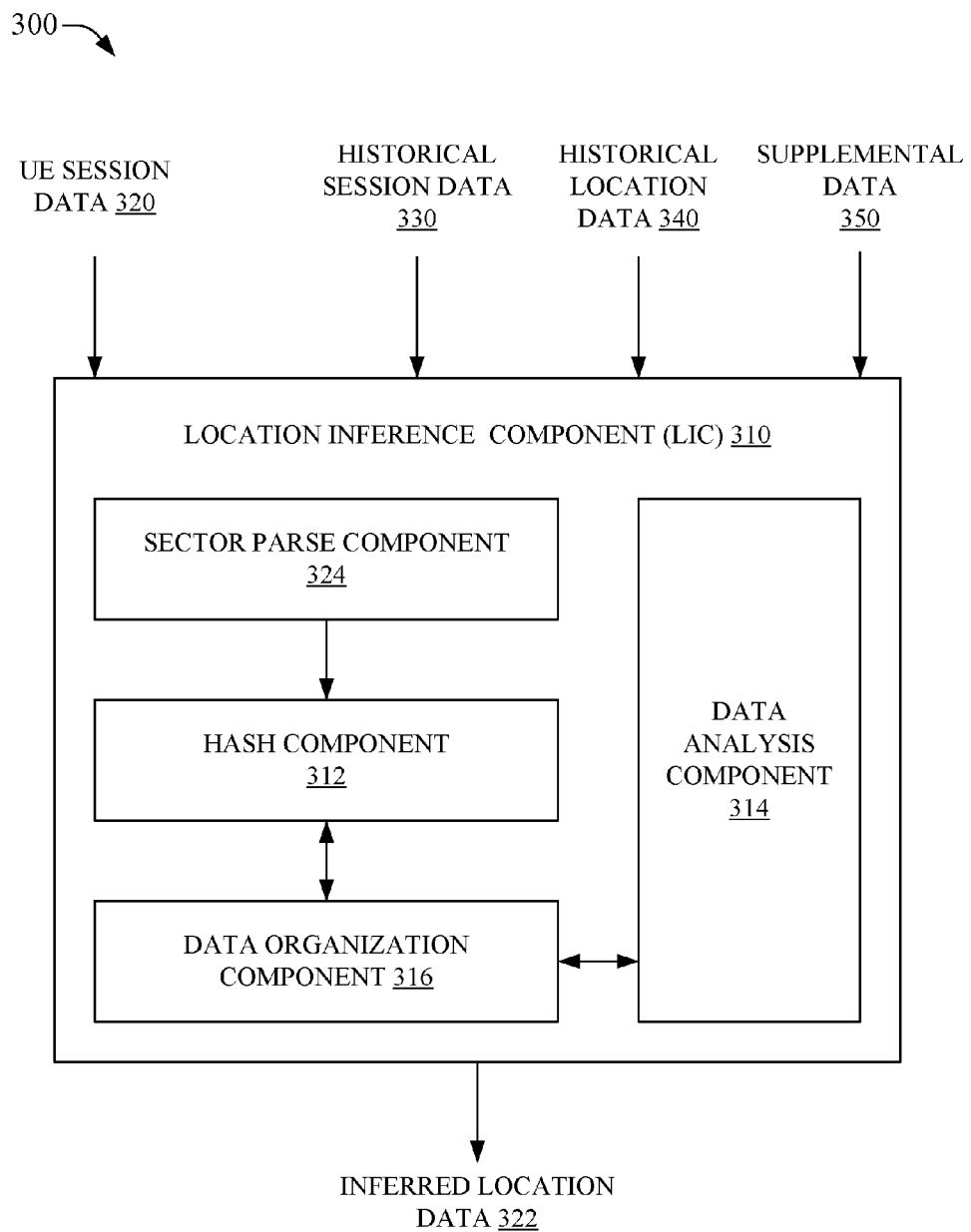
FIG. 3 illustrates an example system that can enable access to inferred location data based on correlating historical session data, historical location data, and supplemental data, and hashing correlated data against current UE sector transition information in accordance with aspects of the subject disclosure.

FIG. 3 illustrates a system 300 that can enable access to inferred location data 322 based on correlating historical session data 330, historical location data 340, and supplemental data 350, and hashing correlated data against current UE sector transition information in accordance with aspects of the subject disclosure. System 300 can comprise LIC 310. LIC 310 can receive historical session data 330. Historical session data 330 can comprise information about historical UE transitions between sectors, e.g., a handover event between sectors of a communication session for a UE. LIC 310 can further receive historical location data 340. Historical location data can comprise accurate location data, e.g., location data determined via GPS, aGPS, etc., for a UE. The historical location data can be employed to determine a location of high UE population density, e.g., a dense bin. The dense bin can represent an area of a sector having a higher density of UEs reporting accurate location data, e.g., an area of the sector where there is a higher density of reporting UEs than other areas of the sector. This can suggest that UEs, both reporting and non-reporting, are typically located in the area of the sector represented by the dense bin. LIC 310 can further receive supplemental data 350. Supplemental data can be data other than accurate location data, e.g., other than GPS data, aGPS data, etc. In an aspect, supplemental data can be employed to determine location data and, in some instances, hyper-accurate location data.

Historical location data 340 and supplemental data 350 can be correlated to historical session data 330 by LIC 310 via data analysis component 314. The correlation(s) can be embodied in a data set. The data set can be updated by data organization component 316 and stored local to LIC 310 or remote from LIC 310. In an aspect, data analysis component 314 can determine a dense bin for a sector, for a given a historical sector transition, based on historical location data 340 and any available supplemental data 350. Data analysis component 314 can determine a first dense bin, for example, by employing a KDE technique, a Gaussian estimator, etc., associated with determining areas of UE density in a given sector.

Data organization component 316 can structure the correlation of the historical sector transition(s) and dense bin(s) into a data set that can be searched, hashed, etc. Correlation of historical location data 340 and supplemental data 350 to sector transition data comprised in historical session data 330 can suggest a relationship between the order of sector transitions and a dense bin of a sector. In an aspect, a UE historically transitioning sectors in a first order can be associated with the same, or a different, dense bin than a UE historically transitioning sectors in a second order. As such, the directionality or order of sector transitions can be individually correlated with a dense bin that can be the same or different and can reflect the environment in which the UE is operating, e.g., route features, user behaviors, etc., which can be reflected in the organization of the data set by data organization component 316.

The correlation of historical location data 340 and supplemental data 350 with historical sector data can be employed in inferring a location of a current UE. LIC 310 can receive UE session data 320. UE session data 320 can comprise current sector transition information for a current UE. Sector parse component 324 can parse current sector transition information from UE session data 320. The current sector transition information can be employed to search a data set structured by data organization component 316. The data set can comprise correlation(s) between historical location data 340, supplemental data 350, and historical session data 330. In an aspect, the current sector transition information parsed from UE session data 320 can be used to search, hash, or traverse the data set to access dense bin information associated with historical data that can be the same as, or similar to, the current sector transition information. In an aspect, this can be performed by hash component 312. Hash component 312 can hash the current sector transition information against the data set to return dense bin data associated with an area of the sector that, under the same/similar sector transitions, can be historically densely populated by location reporting UEs. As an example, where a current UE transitions sectors associated with a route from A to B, and the data set comprises a correlation between historical sector transitions on the route from A to B with a first dense bin, hashing the current UE transitions sectors can return first dense bin information that can be employed to infer that the current UE location is within the area associated with the first dense bin. Likewise, where the current UE traverses sectors from B to A and the historical correlation of B to A is associated with a second dense bin, the hash can return second dense bin data that can be employed in forming an inference that the current UE is located within the second dense bin. As such, LIC 310 can enable access to inferred location data 322.

Figure 4:
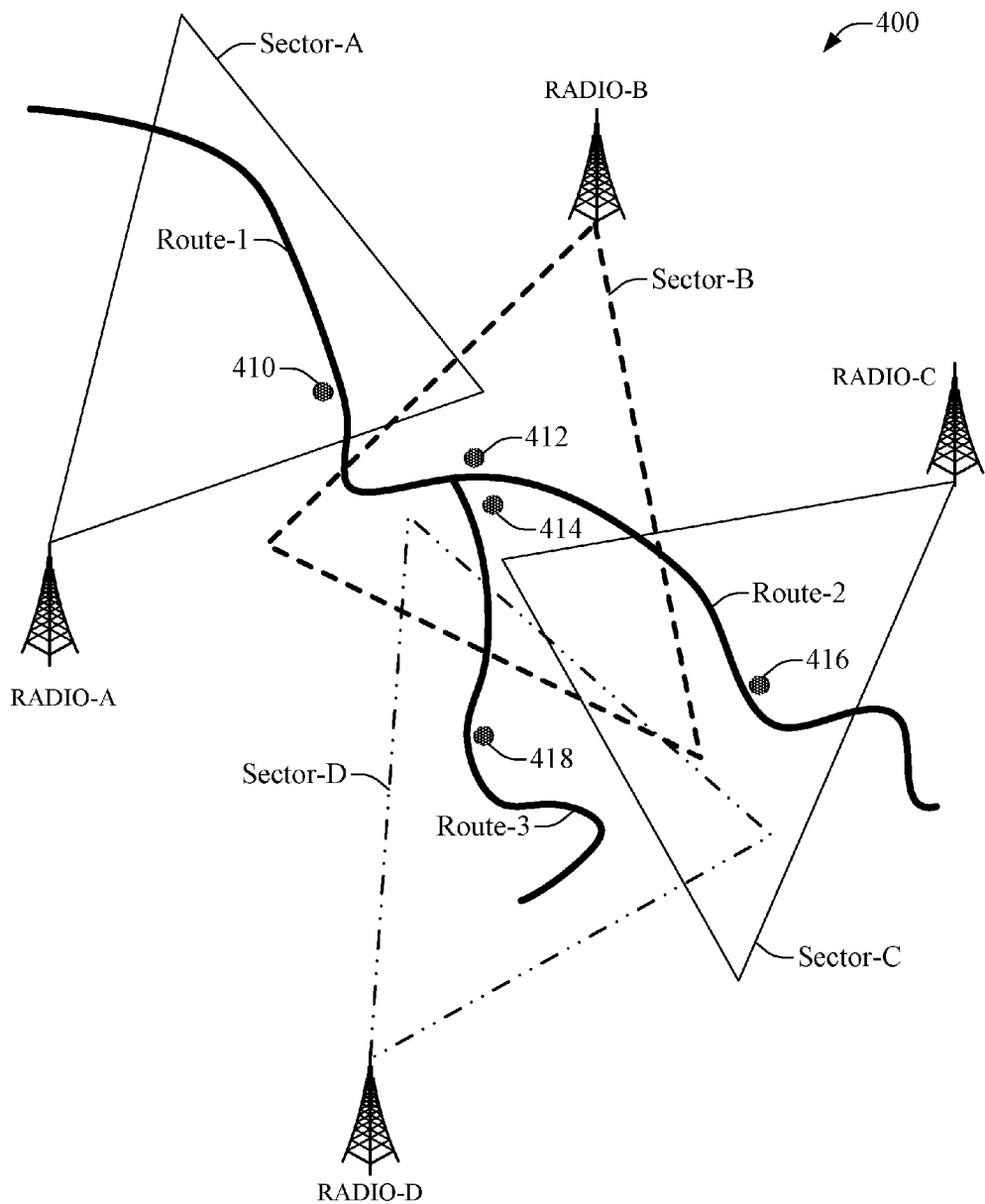
FIG. 4 illustrates an example system that can enable access to inferred location data based on historical session data, historical location data, and supplementary data, in accordance with aspects of the subject disclosure.

FIG. 4 illustrates a system 400 that can enable access to inferred location data based on historical session data, historical location data, and supplementary data, in accordance with aspects of the subject disclosure. System 400 can comprise Radio-A, B, C, and D, that can be correspondingly associated with sector-A, B, C, and D. Sectors A through D can provide wireless service coverage to route-1, 2, and 3 as illustrated.

As illustrated, the physical locations of Radio A through D can be different from the locations of dense UE populations 410-418. In some embodiments, dense UE populations 410-418 can be dense bins. Moreover, as examples, dense UE population 410 can be associated with a transition from sectors B→A, dense UE population 412 can be associated with a transition from sectors A→B and from sectors C→B, dense UE population 414 can be associated with a transition from sectors D→B, dense UE population 416 can be associated with a transition from sectors B→C and from sectors D→C, and dense UE population 418 can be associated with a transition from sectors B→D and from sectors C→D.

A location inference component, not illustrated for clarity, can determine dense UE populations 410-418 and correlate them to sector transitions. A current UE, for example, can be traversing route-1 from sector A→B. The current UE can provide UE session data to the LIC, which can parse the sector transition data from the UE session data, e.g., sector transition from A→B can be parsed from the UE session data by the LIC. The LIC can then determine inferred location data for the current UE, e.g., that the current UE is likely at location of dense UE population 412, e.g., a dense bin, based on historical data indicating that transitions from sector A→B are correlated to accurate location reporting by UEs having a high population density at 412.

Similarly, for example, a current UE traversing route-1 from sector B→A can cause the LIC to return different inferred location data for the current UE, e.g., that the current UE is likely at location of dense UE population 410 based on historical data indicating that transitions from sector B→A are correlated to accurate location reporting by UEs having a high population density at 410. As another example, a current UE traversing route-1 and 3 from sector D→C can cause the LIC to return inferred location data that the current UE is likely at location of dense UE population 416.

Sector-B illustrates two example locations of dense UE population, e.g., 412 and 414. Of interest, these two example locations of dense UE population can be separately associated with different orders of sector transitioning. As an example, transitions from sectors A→B and from sectors C→B can both be correlated to dense bin 412, while transitions from sector D→B can be correlated to dense bin 414.

Sector-D illustrates one example location of dense UE population, e.g., 418. Of interest, this one example location of dense UE population can be associated with a plurality of different orders of sector transitioning. As an example, transitions from sectors A→D, sectors A→B→D, sectors B→D, sectors C→B→D, and sectors C→D can all be correlated to dense bin 418. In an aspect, where route-3 serves all UE movement into sector-D, location of dense UE population 418 can be correlated to all transitions from a starting sector to ending sector D. Of note, numerous other examples of session transitions can be illustrated for system 400, all of which are to be considered part of the current disclosure despite not being explicitly and exhaustively recited for the sake of clarity and brevity.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
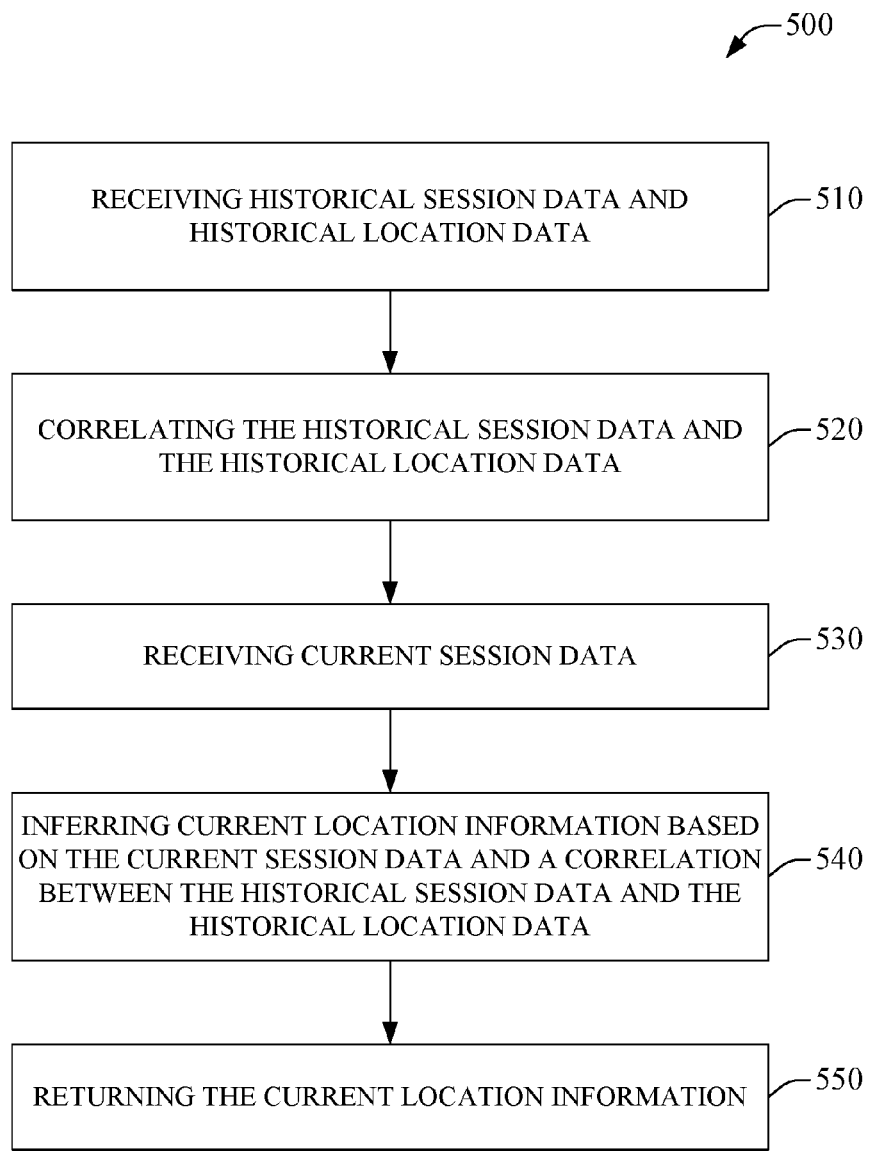
FIG. 5 illustrates an example method facilitating access to inferred location data based on historical session data and historical location data in accordance with aspects of the subject disclosure.

FIG. 5 illustrates a method 500 that enables access to inferred location data based on historical session data and historical location data in accordance with aspects of the subject disclosure. Method 500 can provide location data for mobile devices in a wireless network by leveraging sparse accurate location data. In an aspect, UEs can report accurate location data infrequently to the wireless network. In another aspect, only some UEs may regularly report accurate location data to the wireless network while other UEs do not report at all or only report infrequently. These aspects can result in sparse location data for UEs in any given sector. Leveraging sparse accurate location data can enable inferences of location for UEs. Identifying a likely location for a UE in a wireless network sector can be based on identifying a densely populated location, e.g., a dense bin, etc., in the sector. An inference of a UE location can therefore be based on a location represented by a dense bin of a sector. Moreover, a transition between sectors can be employed in inferring a UE location based on a correlation between a dense bin and a historical sector transition. This can result in location data that can more accurately reflect the location of a UE than simply using a default location associated with a sector. Moreover, the density analysis and correlation to historical sector transitions can adapt to reflect changes in UE population density. As such, the dense bin can reflect changes in where UEs congregate unlike conventional techniques.

At 510, method 500 can receive historical session data and historical location data. Historical location data can comprise accurate location data, e.g., location data determined via GPS, aGPS, etc., for a UE. The historical location data can be employed to determine a location of high UE population density, e.g., a dense bin. The dense bin can represent an area of a sector having a higher density of accurate location data UEs reporting, e.g., an area of the sector where there is a higher density of reporting UEs than other areas of the sector. This can suggest that UEs, both reporting and non-reporting, generally are located in the area represented by the dense bin. Historical session data can comprise information indicating a sector transition(s) as a UE moves along a route. As an example, a UE that transitions sectors while traversing a route from A to B can be associated with a first dense bin, while a UE traversing sectors on a route from B to A can be associated with a second dense bin.

At 520, method 500 can comprise, correlating the historical location and session data. For a wireless network environment having a number of UEs, some of which report accurate location data, the correlation of historical location data to sector transition data can result in a data set that can suggest a relationship between directionality, as is related to the order of sector transitions, and a dense bin. In an aspect, a UE historically transitioning sectors in a first order can be associated with the same, or a different, dense bin than a UE historically transitioning sectors in a second order. As such, the directionality or order of sector transitions can be individually correlated with a dense bin that can be the same or different than correlations to a dense bin for other sector transitions and can reflect the environment in which the UE is operating, e.g., route features, user propensities, etc. Method 500, at 530, can comprise receiving current session data. Current session data can comprise sector transition(s) for a current UE.

At 540, method 500 can comprise inferring current location information based on the current session data and a correlation between the historical session and location data. Sector transition information for the current UE can be employed to search a data set comprising a correlation(s) between historical location data and historical session data. As an example, where a current UE transitions sectors associated with a route from A to B, and the data set comprises a correlation between historical sector transitions on the route from A to B with a first dense bin, it can be inferred that the current UE location is within the area associated with the first dense bin. As such, method 500 can enable access to inferred location data, which can be returned in response to a query as shown at 550 of method 500. Inferred location data can comprise location information for a first dense bin based on the current sector transition and a correlation between the first dense bin, determined from historical location data, and historical session data. At this point, method 500 can end.

In some embodiments, sector transitions can be limited to single hop transitions from a first sector to a second sector. Where a route comprises a plurality of sector transitions, for example from sector A→B→C→D, each sector hop can be correlated to a dense bin based on the order of the sector transition. Parsing of multiple hop sector transitions into single hop segments can reflect historical conditions/behaviors for transitions between each sector of a route comprising a plurality of sector transitions. In some embodiments, the data set can further comprise single hop segments from other routes, such as other historical data for transitions from sector D→C, other historical data for A→B, other historical data for B→C, etc. Moreover, in some embodiments, such as where sector overlap allows, other route segments can be included in the data set, such as other historical data for A→D, indicating that a transition can be by a first route from A→B→D and another route can be from A→D directly. For a current UE transitioning from sector A→D, these embodiments can be employed to form an inference that the current UE is at a first dense bin of D only for transitions from sector C→D, a second dense bin of D only for transitions from sector B→D, and a third dense bin of D for transitions from sector A→D. Of note, combinations of the first, second, and third dense bin of D can be the same or different.

In some embodiments, the sector transitions can comprise a plurality of transitions from a starting sector to an ending sector. As before, where a route comprises a plurality of sector transitions, for example from sector A→B→C→D, a correlation between the historical location data in sector D and the transition from sector A (the starting sector) to D (the ending sector) can be determined. This determined correlation can reflect that UEs starting in A and ending in D can typically be associated with a dense bin in D and that the transition across sectors B and C can be inherently convolved in the sector transition pair "A→D". In an aspect, where other routes between sector A and sector D are also represented, for example A→B→F→D, then the dense bin in D can reflect behaviors associated with UEs starting at sector A and ending at sector D for multiple routes, e.g., both A→B→C→D and A→B→F→D. For a current UE transitioning then from sector A→D, these embodiments can form an inference that the current UE is at the dense bin of D regardless of the specific route between starting sector A and ending at sector D.

Figure 6:
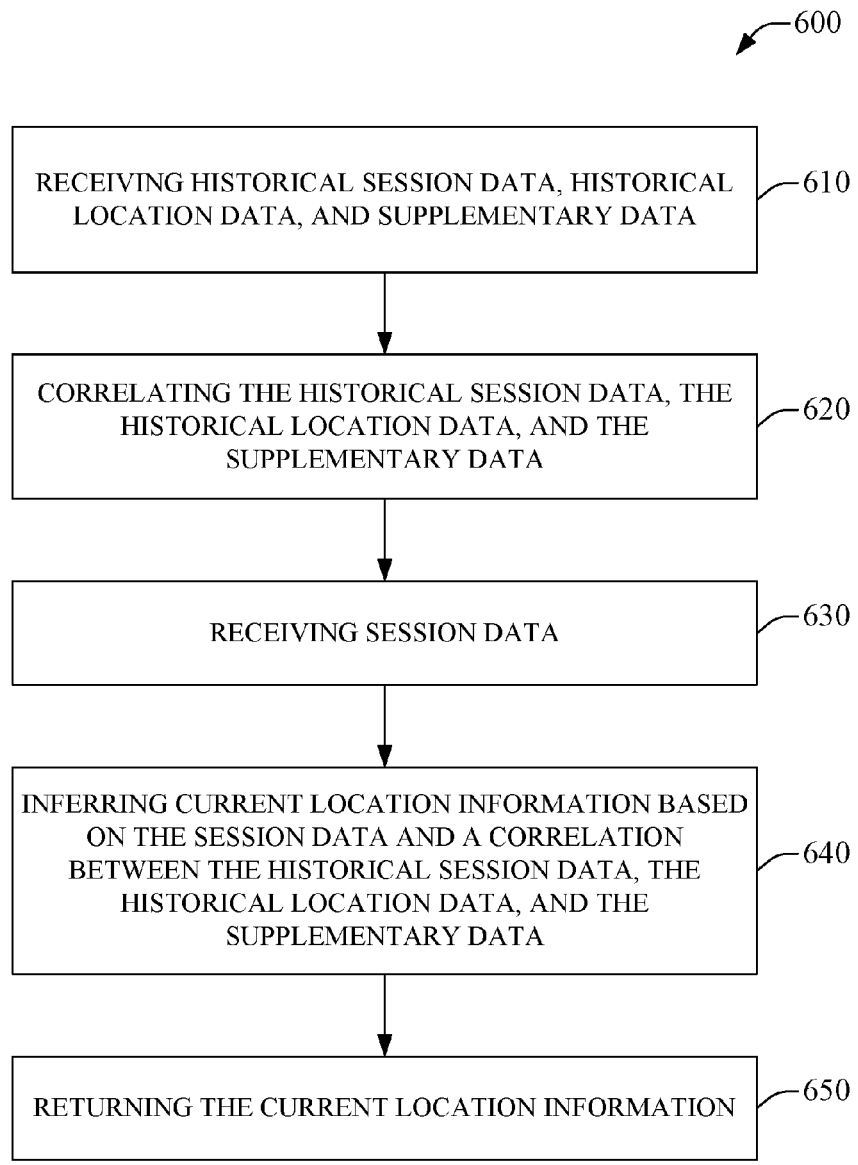
FIG. 6 illustrates an example method enabling access to inferred location data based on historical session data, historical location data, and supplementary data, in accordance with aspects of the subject disclosure.

FIG. 6 illustrates a method 600, which enables access to inferred location data based on historical session data, historical location data, and supplementary data, in accordance with aspects of the subject disclosure. Method 600 can provide location data for mobile devices in a wireless network by leveraging sparse accurate location data. Leveraging sparse accurate location data can enable inferences of location for UEs. Identifying a likely location for a UE in a wireless network sector can be based on identifying a densely populated location, e.g., a dense bin, etc., in the sector. An inference of a UE location can therefore be based on a location represented by a dense bin of a sector. Moreover, a transition between sectors can be employed in inferring a UE location based on a correlation between a dense bin and a historical sector transition.

At 610, method 600 can receive historical session data, historical location data, and supplemental data. Historical location data can comprise accurate location data for a UE. The historical location data can be employed to determine a location of high UE population density, e.g., a dense bin. This can suggest that UEs, both reporting and non-reporting, generally are located in the area represented by the dense bin. Historical session data can comprise information indicating a sector transition(s) as a UE moves along a route, e.g., handover between sectors during a wireless communication session. The sector transition(s) can be associated with a location in the ending sector. As an example, a UE that transitions sectors while traversing a route from A to B can be associated with a first dense bin, while a UE traversing sectors on a route from B to A can be associated with a second dense bin. Supplemental data can comprise data other than accurate location data, e.g., other than GPS data, aGPS data, etc. In an aspect, supplemental data can be employed to determine location data and, in some instances, hyper-accurate location data. Numerous examples of supplemental data can be readily appreciated and all are considered within the scope of the current disclosure even where not explicitly recited herein for the sake of clarity and brevity.

At 620, method 600 can comprise correlating the historical location data, historical session data, and supplementary data. For a wireless network environment having a number of UEs, some of which report accurate location data, the correlation of historical location data, historical sector transition data, and supplemental data, can result in a data set that can suggest a relationship between directionality, as is related to the order of sector transitions, and a dense bin. The inclusion of supplemental data can improve correlating a sector transition with a dense bin and/or, in some circumstances, a hyper-accurate location. As an example, supplemental data can comprise roadway topological information, traffic information, etc., that can be correlated to areas of high UE density as related to a historical sector transition. Continuing the example, a correlation can be established reflecting that during rush hour, an area of road construction is resulting in a high density of UEs at a portion of the roadway for a given sector transition, but that the high density does not occur at that location outside of rush hour. Moreover, where the dense bin area is larger than the width of the roadway, the road topography supplementary data can be correlated to the historical location and session data to infer a hyper-accurate location, e.g., on the roadway rather than off in the bushes along the roadway. Correlating the supplemental information can therefore improve returned location inferences by considering time of day, completion of the construction event, etc.

In an aspect, a UE historically transitioning sectors in a first order can be associated with the same, or a different, dense bin than a UE historically transitioning sectors in a second order. As such, the directionality or order of sector transitions can be individually correlated with a dense bin that can be the same or different than correlations to a dense bin for other sector transitions and can reflect the environment in which the UE is operating, e.g., route features, user propensities, etc.

Method 600, at 630, can comprise receiving current session data. Current session data can comprise sector transition(s) for a current UE. Current session data can enable searching of correlations determined at 620, e.g., in a data set comprising a correlation(s) between the historical location data, historical session data, and supplementary data. Information from the current session data can be used in hashing of the data set, a key for indexing through the data set, as a search term against the data set, as a filter for the data set, etc. Current session data can reflect a current condition of a UE that can be used to draw conclusions from analyses performed on historical data.

At 640, method 600 can comprise inferring current location information based on the current session data and a correlation between the historical session data, historical location data, and supplementary data. Sector transition information for the current UE can be employed to search a data set comprising a correlation(s) between historical location data and historical session data. As an example, where a current UE transitions sectors associated with a route from A to B, and the data set comprises a correlation between historical sector transitions on the route from A to B with a first dense bin, it can be inferred that the current UE location is within the area associated with the first dense bin. As such, method 600 can enable access to inferred location data, which can be returned in response to a query as shown at 650 of method 600. Inferred location data can comprise location information for a first dense bin based on the current sector transition and a correlation between the first dense bin, determined from historical location data, and historical session data. At this point, method 600 can end.

Figure 7:
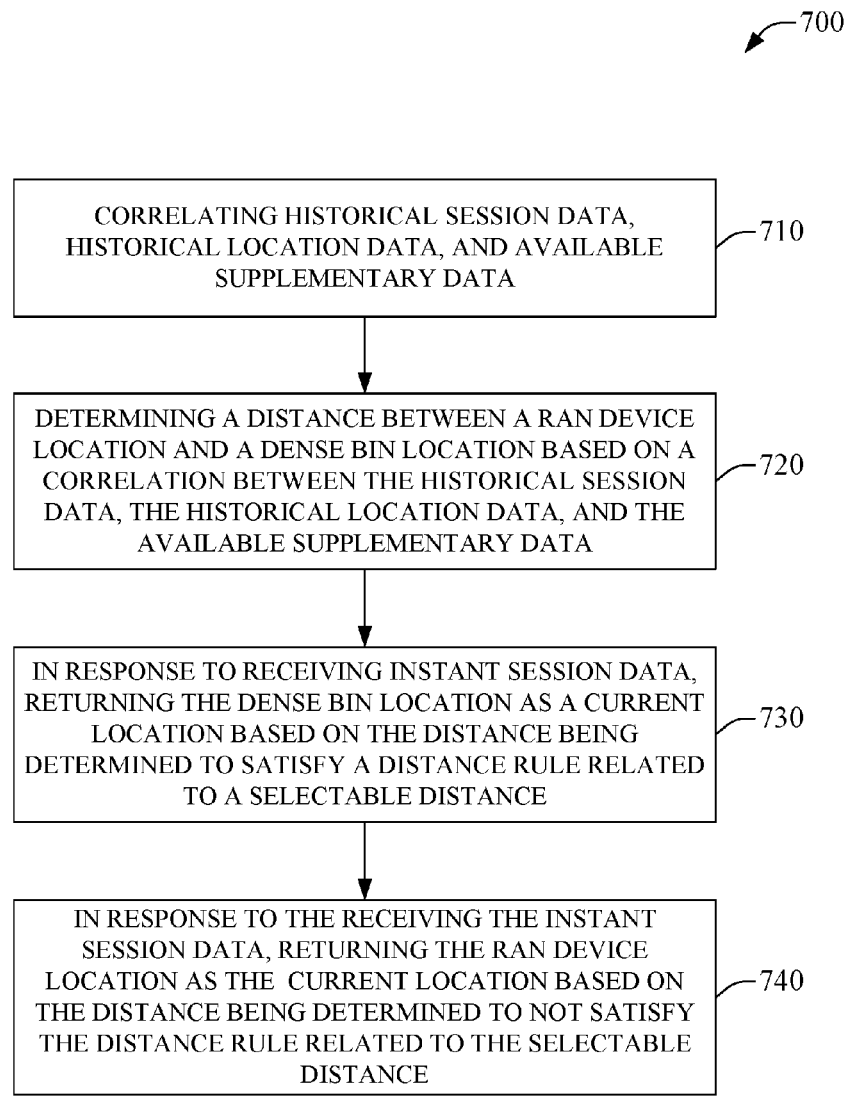
FIG. 7 depicts an example method that can enable access to inferred location data based on satisfying a distance rule related to a distance between a radio device location and a historically dense location within a sector in accordance with aspects of the subject disclosure.

FIG. 7 illustrates a method 700 that can enable access to inferred location data based on satisfying a distance rule related to a distance between a radio device location and a historically dense location within a sector in accordance with aspects of the subject disclosure. Method 700 can provide location data for mobile devices in a wireless network by leveraging sparse accurate location data. Leveraging sparse accurate location data can enable inferences of location for UEs. Identifying a likely location for a UE in a wireless network sector can be based on identifying a densely populated location, e.g., a dense bin, etc., in the sector. An inference of a UE location can be based on a location represented by a dense bin of a sector. Moreover, a transition between sectors can be employed in inferring a UE location based on a correlation between a dense bin and a historical sector transition.

At 710, method 700 can receive historical session data, historical location data, and supplementary data. Historical location data can comprise accurate location data for a UE. The historical location data can be employed to determine a location of high UE population density, e.g., a dense bin. This can suggest that UEs, both reporting and non-reporting, generally are located in the area represented by the dense bin. Historical session data can comprise information indicating a sector transition(s) as a UE moves along a route, e.g., handover between sectors during a wireless communication session. The sector transition(s) can be associated with a location in the ending sector. As an example, a UE that transitions sectors while traversing a route from A to B can be associated with a first dense bin, while a UE traversing sectors on a route from B to A can be associated with a second dense bin. Supplemental data can comprise data other than accurate location data, e.g., other than GPS data, aGPS data, etc. In an aspect, supplemental data can be employed to determine location data and, in some instances, hyper-accurate location data.

At 720, method 700 can comprise determining a distance between a RAN device location and a dense bin location based on a correlation between the historical location data, historical session data, and supplementary data. For a wireless network environment having a number of UEs, some of which report accurate location data, the correlation of historical location data, historical sector transition data, and supplemental data, can result in a data set that can suggest a relationship between directionality, as is related to the order of sector transitions, and a dense bin. The inclusion of supplemental data can improve correlating a sector transition with a dense bin and/or, in some circumstances, a hyper-accurate location. Correlating the supplemental information can therefore improve returned location inferences. In an aspect, a UE historically transitioning sectors in a first order can be associated with the same, or a different, dense bin than a UE historically transitioning sectors in a second order. As such, the directionality or order of sector transitions can be individually correlated with a dense bin that can be the same or different than correlations to a dense bin for other sector transitions and can reflect the environment in which the UE is operating, e.g., route features, user propensities, etc. Where a RAN radio device location is typically fixed and known, the distance between the RAN radio device location and a dense bin can be determined.

Method 700, at 730, can comprise receiving current session data. In response to receiving the current session data, method 700 can return the dense bin location as a current location based on the distance determined at 720 being determined to satisfy a distance rule related to a selectable distance. Current session data can comprise sector transition(s) for a current UE. Current session data can enable searching of correlations determined at 720, e.g., in a data set comprising a correlation(s) between the historical location data, historical session data, and supplementary data. Current session data can reflect a current condition of a UE that can be used to draw conclusions from analyses performed on historical data. The current session data can therefore be employed to infer that the current UE is at a dense bin of a sector. Where the distance between the dense bin and the radio device satisfies the distance rule, such as for example, being greater than the selected distance, the location of the dense bin can be returned in response to a location query for the current UE based on the inference.

At 740, method 700 can comprise receiving the current session data and in response, method 700 can return the location of the RAN radio device as the current location based on the distance determined at 720 being determined not to satisfy the distance rule related to the selectable distance. Where the distance between the dense bin and the radio device does not satisfy the distance rule, such as for example, being less than the selected distance, the location of the RAN radio device can be returned in response to a location query for the current UE based on the inference, e.g., where the dense bin and radio device are co-located, the location of the radio device can be used, etc. At this point, method 700 can end.

Figure 8:
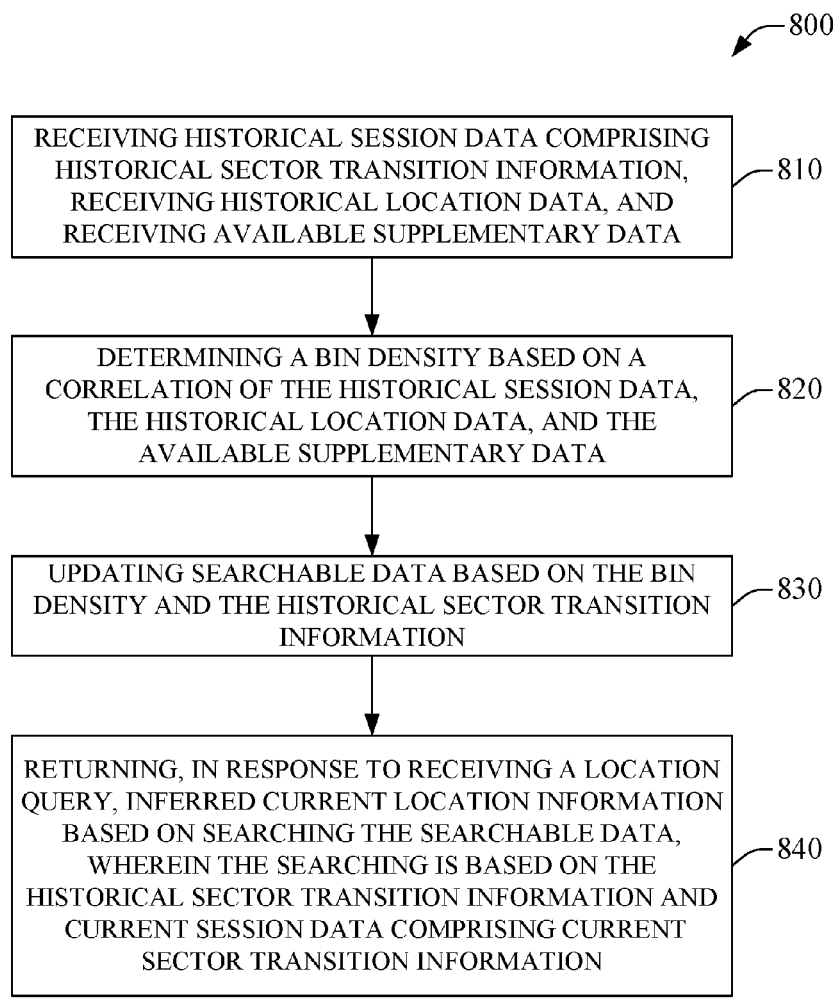
FIG. 8 illustrates an example method that, in response to receiving a location query, can return inferred location data from searchable data that is updated based on a correlation between historical session data, historical location data, and available supplementary data, in accordance with aspects of the subject disclosure.

FIG. 8 illustrates a method 800 that, in response to receiving a location query, can return inferred location data from searchable data that is updated based on a correlation between historical session data, historical location data, and available supplementary data, in accordance with aspects of the subject disclosure. Method 800 can provide location data for mobile devices in a wireless network by leveraging sparse accurate location data. Leveraging sparse accurate location data can enable inferences of location for UEs. Identifying a likely location for a UE in a wireless network sector can be based on identifying a densely populated location, e.g., a dense bin, etc., in the sector. An inference of a UE location can therefore be based on a location represented by a dense bin of a sector. Moreover, a transition between sectors can be employed in inferring a UE location based on a correlation between a dense bin and a historical sector transition.

At 810, method 800 can receive historical session data, historical location data, and supplemental data. Historical location data can comprise accurate location data for a UE. The historical location data can be employed to determine a location of high UE population density, e.g., a dense bin. This can suggest that UEs, both reporting and non-reporting, generally are located in the area represented by the dense bin. Historical session data can comprise information indicating a sector transition(s) as a UE moves along a route, e.g., handover between sectors during a wireless communication session. The sector transition(s) can be associated with a location in the ending sector. Supplemental data can comprise data other than accurate location data. In an aspect, supplemental data can be employed to determine location data and, in some instances, hyper-accurate location data.

At 820, method 800 can comprise determining a bin density based on a correlation of the historical location data, historical session data, and supplementary data. For a wireless network environment having a plurality of UEs, some of which report accurate location data, the correlation of historical location data, historical sector transition data, and supplemental data, can result in a data set that can suggest a relationship between directionality, as is related to the order of sector transitions, and a dense bin. The inclusion of supplemental data can improve correlating a sector transition with a dense bin and/or, in some circumstances, a hyper-accurate location. Correlating the supplemental information can therefore improve returned location inferences by considering time of day, completion of the construction event, etc. Bin density can be determined, e.g., computed, etc., based on a KDE technique, a Gaussian estimator, etc., in view of the order of sector transitions and in view of characteristics of the supplemental data. As an example, where supplemental data indicates reporting devices using a first AP at one end of a shopping mall but not using a second AP at the other end of a shopping mall, the bin density can reflect that the more historically dense bin is the bin comprising the first AP. In an aspect, a UE historically transitioning sectors in a first order can be associated with the same, or a different, dense bin than a UE historically transitioning sectors in a second order. As such, the directionality or order of sector transitions can be individually correlated with a dense bin that can be the same or different than correlations to a dense bin for other sector transitions and can reflect the environment in which the UE is operating, e.g., route features, user propensities, etc.

Method 800, at 830, can comprise updating searchable data, e.g., in a searchable data set, based on the bin density and the historical sector transition information. Where a data set comprises a correlation (s) between historical location(s), sector transition(s), and supplemental data, a feature of the correlation can be bin density(ies) for bins within a sector as determined at 820. In some embodiments, bin density for bins in a sector can be visualized as a heat map. The heat map can be combined with other information, e.g., road maps, geographical maps, network equipment maps, etc., to visualize areas of high reporting UE density relative to sector transitions, e.g., a first order of sector transitions can present a different visualization than for a second order of sector transitions.

At 840, method 800 can comprise enabling access to inferred current location information in response to receiving a query. The inferred current location information can be based on searching the searchable data updated at 830. Current session data can comprise sector transition(s) for a current UE. Information from the current session data can be used in hashing of the data set, a key for indexing through, as a search term against, as a filter for, etc., the searchable data updated at 830. Current session data can reflect a current condition of a UE that can be used to draw conclusions from analyses performed on historical data. As such, method 800 can enable access to inferred location data, which can be returned in response to a query. Inferred location data can comprise location information for a first dense bin based on the current sector transition and a correlation between the first dense bin and historical session data. At this point, method 800 can end.

Figure 9:
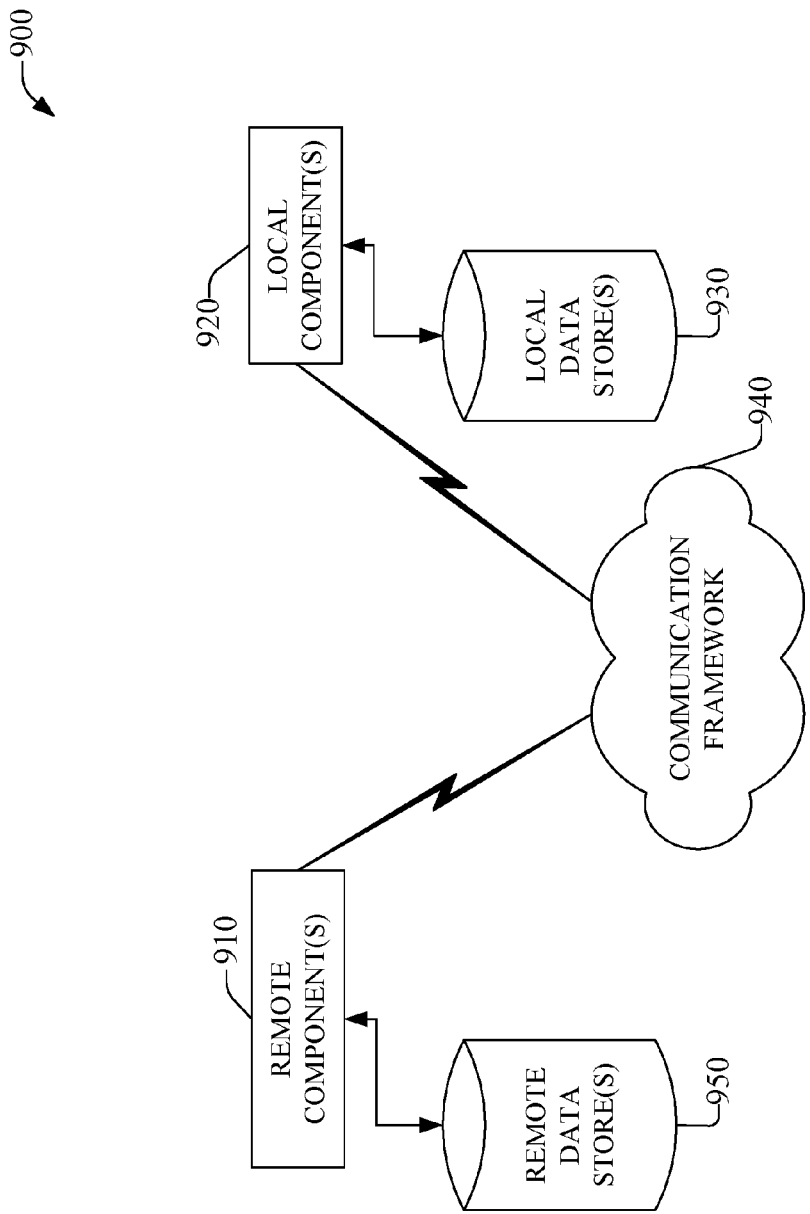
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise servers, personal servers, wireless telecommunication network devices, etc. As an example, remote component(s) 910 can be location inference component 110-310, etc., a RAN radio device, etc.

The system 900 also comprises one or more local component(s) 920. The local component(s) 920 can be hardware and/or software (e.g., threads, processes, computing devices). In some embodiments, local component(s) 920 can comprise, for example, a UE, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940.

Figure 10:
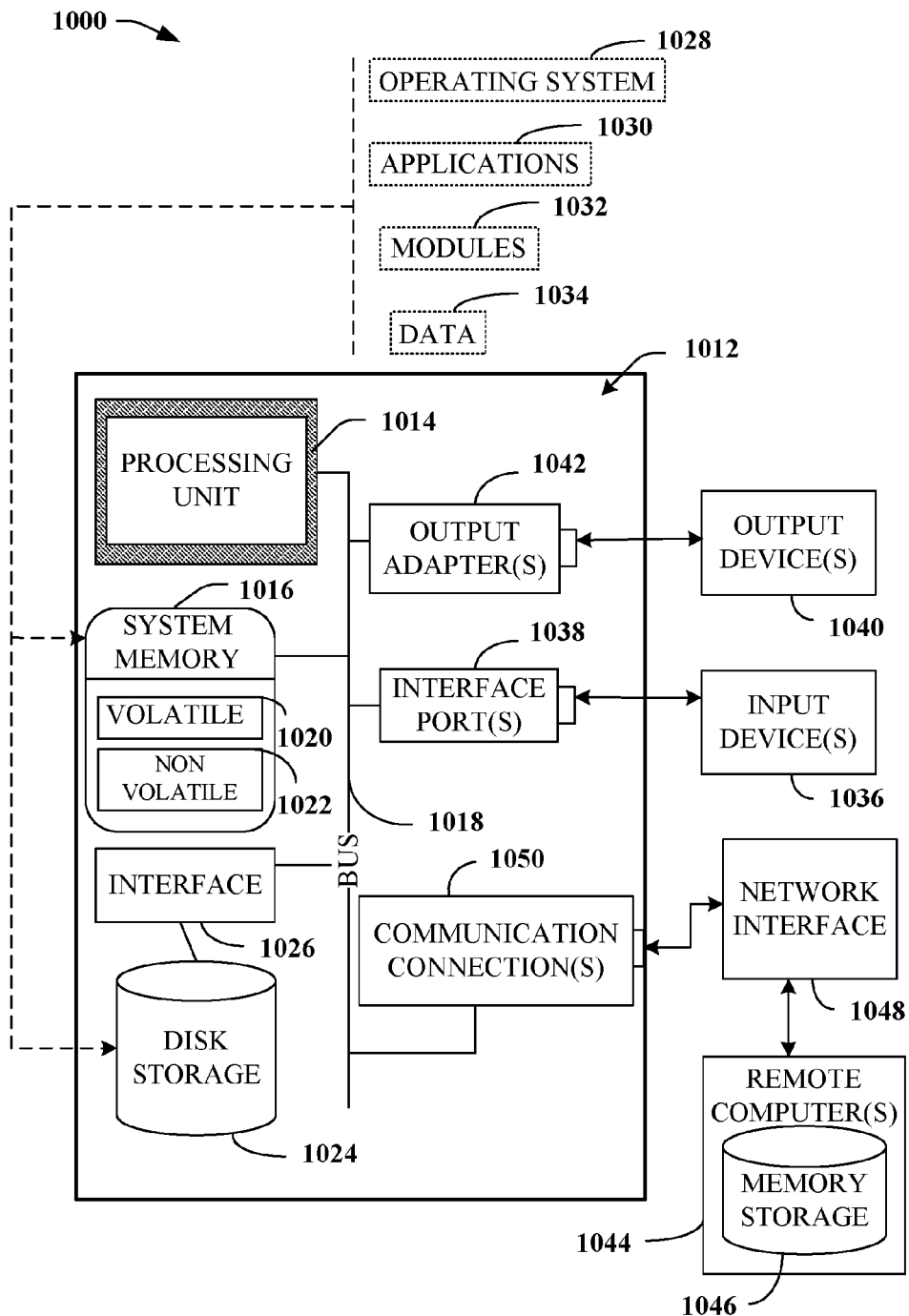
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, Synchlink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, LIC 110-310, etc., a UE, a RAN radio device, a NodeB, an eNodeB, etc., comprises a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, micro-channel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, Synchlink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, cause a system comprising a processor to perform operations, comprising: receiving historical data from a data store and further receiving current session data, via an air interface or other wireless interface from a UE to enable inferring location data of the UE.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. As an example, a UE can comprise a user interface that accepts an input that can initiate a location information query to a LIC, e.g., LIC 110-310, etc. As another example, data analysis component 314 can receive via a command line interface a parameter setting input, etc., as input by a user via a user interface that is located either local or remote from the LIC. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can storing and/or processing data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, terahertz broadcasts, etc.); Ethernet; X.25; power-line-type networking, e.g., Powerline audio video Ethernet, etc.; femtocell technology; Wi-Fi; worldwide interoperability for microwave access; enhanced general packet radio service; third generation partnership project, long term evolution; third generation partnership project universal mobile telecommunications system; third generation partnership project 2, ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system comprising:
   a processor; and
   a memory that stores executable instructions that, when executed by the processor, facilitate performance of operations, comprising:
   determining a historical density of a plurality of user equipments in a region based on historical location data provided by the plurality of user equipments;
   correlating the historical density with historical network session data comprising historical starting antenna sector data relating to a first historical antenna sector employed prior to a time period and historical ending antenna sector data relating to a second historical antenna sector employed prior to the time period;
   receiving starting antenna sector data and ending antenna sector data for a network session of a user equipment, wherein the starting antenna sector data and the ending antenna sector data are employed in the time period;
   determining a probable location of the user equipment based on the starting antenna sector data and the ending antenna sector data of the user equipment and a first correlation of the historical density with the historical network session data; and
   in response to receiving a request from another system for access to the probable location of the user equipment, enabling access to the probable location of the user equipment.

2. The system of claim 1, wherein the correlating further comprises correlating supplementary data to the historical density.

3. The system of claim 2, wherein the supplementary data comprises geographical map information.

4. The system of claim 3, wherein the geographical map information comprises roadway information.

5. The system of claim 1, wherein:
   the first correlation of the historical density with the historical network session data is related to a first historical antenna sector transition from the first historical antenna sector to the second historical antenna sector,
   a second correlation of the historical density with the historical network session data is related to a second historical antenna sector transition from a third historical antenna sector to the second historical antenna sector, and
   the first correlation and the second correlation are different.

6. The system of claim 1, wherein:
   the first correlation of the historical density with the historical network session data is related to a first historical antenna sector transition from the first historical antenna sector to the second historical antenna sector,
   a second correlation of the historical density with the historical network session data is related to a second historical antenna sector transition from a third historical antenna sector to the second historical antenna sector, and
   the first correlation and the second correlation are a same correlation.

7. The system of claim 1, wherein the first correlation of the historical density with the historical network session data is related to a historical antenna sector transition from the first historical antenna sector to the second historical antenna sector.

8. The system of claim 1, wherein the first correlation of the historical density with the historical network session data is related to a historical antenna sector transition from the first historical antenna sector to the second historical antenna sector via a historical intervening antenna sector.

9. A method, comprising:
receiving, by a device comprising a processor, historical location data related to a historical location of a first user equipment within a first time period prior to a second time period;
receiving, by the device, historical communication session data related to a historical antenna sector transition of the first user equipment within the first time period;
determining, by the device, a first correlation between the historical location data and the historical communication session data within the first time period, wherein the first correlation is related to a first transition between a first starting antenna sector and a first ending antenna sector within the first time period;
receiving, by the device, a second starting antenna sector and a second ending antenna sector of a communication session of a second user equipment within the second time period;
determining, by the device, a location of the second user equipment, based on the second starting antenna sector and the second ending antenna sector and the first correlation between the historical location data and the historical communication session data; and
enabling, by the device, access to location information for the location of the user equipment by a requesting device.

10. The method of claim 9, wherein the receiving further comprises receiving available supplemental data, and wherein the determining the correlation is further related to the supplemental data.

11. The method of claim 10, wherein the supplemental data comprises a search term corresponding to the historical location data to be used to search network devices of a network for search results related to the search term.

12. The method of claim 10, wherein the supplemental data comprises a billing address corresponding to the first user equipment.

13. The method of claim 9, wherein the supplemental data comprises roadway topography information corresponding to the historical antenna sector transition of the first user equipment.

14. The method of claim 9, wherein the first ending antenna sector is a same sector as a second ending antenna sector, wherein the first starting antenna sector is a different sector from a third starting antenna sector, and wherein the first correlation is a same correlation as a second correlation related to a second historical transition between the third starting antenna sector and the second ending antenna sector.

15. The method of claim 9, wherein the first ending antenna sector is a same sector as a second ending antenna sector, wherein the first starting antenna sector is a different sector as a third starting antenna sector, and wherein the first correlation is a different correlation from a second correlation related to a second historical transition between the third starting antenna sector and the second ending antenna sector.

16. The method of claim 9, wherein the determining the first correlation is related to the first transition between the first starting antenna sector and the first ending antenna sector, and wherein the first transition comprises an intervening historical antenna sector transition between the first starting antenna sector and the first ending antenna sector.

17. The method of claim 9, wherein the determining the first correlation is related to the first transition between the first starting antenna sector and the first ending antenna sector, and wherein the first transition does not comprise an intervening historical antenna sector transition between the first starting antenna sector and the first ending antenna sector.

18. A machine-readable storage medium, comprising executable instructions that, when executed by a processor, facilitate performance of operations, comprising:
receiving historical location data related to a historical location of a first user equipment at a first time of a first time period and receiving historical network session data related to a historical sector transition of the first user equipment, wherein the historical sector transition relates to a first transition between a first starting antenna sector and a first ending antenna sector during the first time period;
determining a first correlation between the historical location data and the historical session data, wherein the first correlation is related to the first transition;
receiving current starting antenna sector data and current ending antenna sector data of a network session in which a second user equipment participates during a second time period ending after the first time period;
determining a first location of the second user equipment, based on an antenna sector transition of the second user equipment from a current starting antenna sector to a current ending antenna sector and the first correlation between the historical location data and the historical session data; and
enabling access by a requesting device to the location information related to the location of the second user equipment.

19. The machine-readable storage medium of claim 18, wherein the first ending antenna sector is a same sector as a second ending antenna sector, wherein the first starting antenna sector is a different sector as a second starting antenna sector, wherein the first location is a same location as a second location determined for a second antenna sector transition of the second user equipment and a second correlation between the historical location data and the historical session data, and wherein the second correlation is related to a second transition between the second starting antenna sector and the second ending antenna sector.

20. The machine-readable storage medium of claim 18, wherein the first ending antenna sector is a same sector as a second ending antenna sector, wherein the first starting antenna sector is a different sector as a second starting antenna sector, wherein the first location is different from a second location determined for a second antenna sector transition of the second user equipment and a second correlation between the historical location data and the historical session data, and wherein the second correlation is related to a second transition between the second starting antenna sector and the second ending antenna sector.

* * * * *